W. P. LIMACHER.
BRACKET HOLDER FOR AUTOMOBILE BUMPERS.
APPLICATION FILED JULY 22, 1920.
1,371,633.
Patented Mar. 15, 1921.
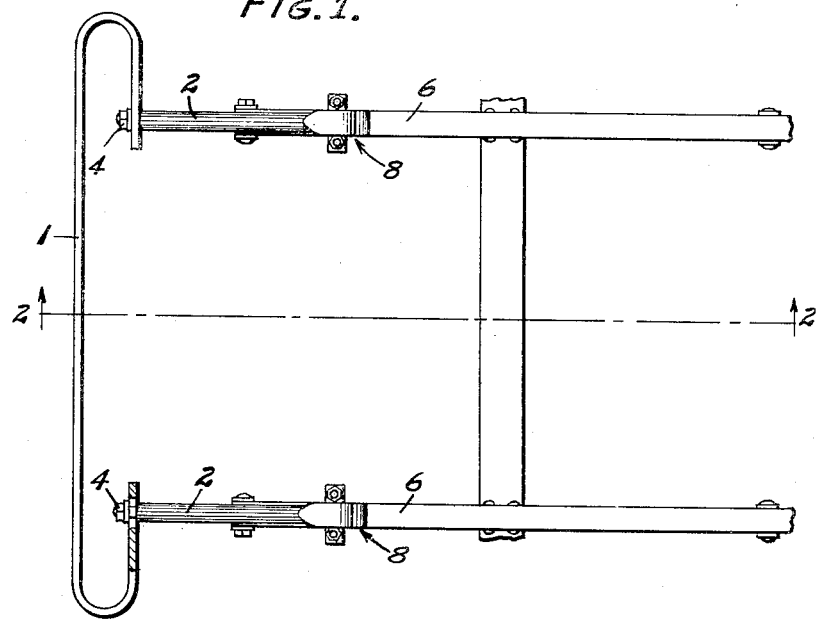
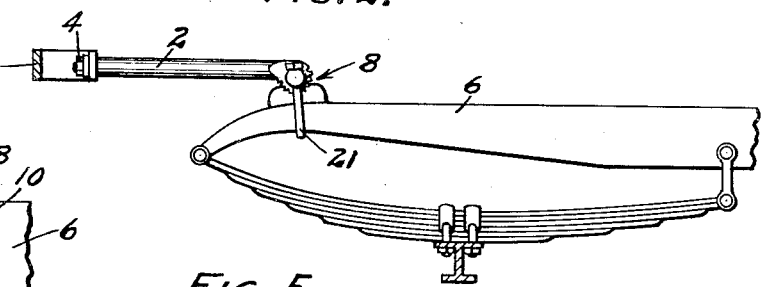
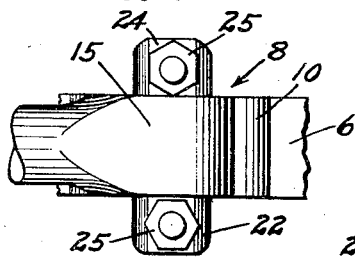
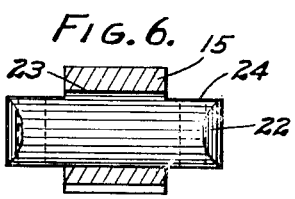
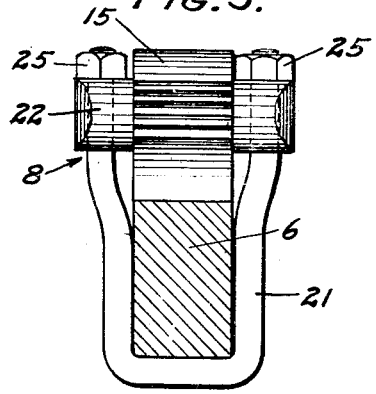
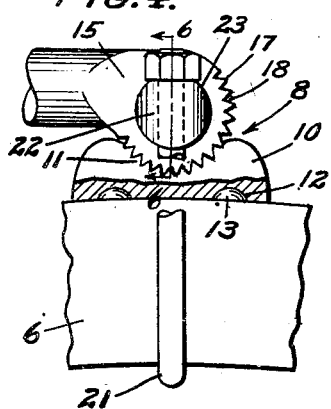
INVENTOR
WALTER P. LIMACHER
BY
*Hazard & Miller*
ATTORNEYS.

UNITED STATES PATENT OFFICE.

WALTER P. LIMACHER, OF PASADENA, CALIFORNIA.

BRACKET-HOLDER FOR AUTOMOBILE-BUMPERS.

1,371,633.  Specification of Letters Patent.  Patented Mar. 15, 1921.

Application filed July 22, 1920. Serial No. 398,250.

*To all whom it may concern:*

Be it known that I, WALTER P. LIMACHER, a citizen of the United States, residing at Pasadena, in the county of Los Angeles and State of California, have invented new and useful Improvements in Bracket-Holders for Automobile-Bumpers, of which the following is a specification.

This invention relates to bracket holders for automobile bumpers, and has for its object the provision of an improved construction whereby the brackets may be readily adjusted relative to their holders and then positively held in position by the same means which form adjustable attaching means for the bracket holders.

The invention will be readily understood from the following description of the accompanying drawings, in which—

Figure 1 is a top plan view of a bumper showing bumper bracket holders embodying the principles of my invention, the holders being attached to automobile side bars and the side bars being broken away.

Fig. 2 is a vertical longitudinal sectional detail on the line 2—2 of Fig. 1 and looking in the direction indicated by the arrow.

Fig. 3 is a plan view of the bumper bracket, partly broken away, and its holder.

Fig. 4 is a side elevation of the same showing a portion of an automobile side bar to which the holder is secured.

Fig. 5 is an end elevation of a bumper bracket and its holder.

Fig. 6 is a transverse section on the line 6—6 of Fig. 4.

The bumper 1 is secured to brackets 2 by bolts or rivets 4, and the rear ends of the brackets are secured to the side bars 6 by bumper bracket holders 8.

Each of the bumper bracket holders consist of a block 10 having the curved recess 11 extending longitudinally of the top thereof. The block 10 is adapted to be secured to the side bar 6 lengthwise thereof and is, preferably, provided at its under side with a plurality of recesses 12 along the length of said block and arranged to be engaged by coöperating studs 13 projecting upwardly from the side bar in order to retain the block 10 in longitudinally adjusted position relative to the side bar.

The end of the bumper bracket is received in recess 11 for which purpose said end of the bracket is shown as an enlargement 15 curved to fit the recess 11. The engaging surfaces of enlargement 15 and recess 11 are provided with coöperating transverse teeth 17 and grooves 18 adapted for engagement to prevent turning movement of the bracket end relative to the holder block when the parts are clamped to one another.

The means employed for clamping the bumper bracket relative to the block 10 and at the same time clamping block 10 to side bar 6, consists of a U-shaped clip 21 received around the side bar with the ends of the clip extending upwardly through the opposite ends of a suitable pin 22 which is rotatably received through a bearing 23 extending through the enlargement 15. Flattened portions 24 are, preferably, provided upon pin 22 at the sides of the apertures through which the clip ends extend which are adjacent the free ends of said clip ends. Nuts 25 are threaded upon said free ends of the clip ends and abut against the flattened portions 24 of pin 23 for drawing the clip 21 into positive clamping engagement around side bar 6 and holder block 10.

When in use it will be understood that clips 21 are loosened and the holder blocks 10 adjusted along the side bars 6 until their recesses 12 are engaged by suitable ones of the studs 13 and the bumper brackets are then rotated relative to the holder blocks until they are in the desired position. The nuts 25 will then be tightened for drawing the clips 21 into clamping engagement around the holder blocks and the side bars so as to draw the holder blocks against the side bars, and at the same time draw the coöperating teeth and grooves of the holder blocks and the enlargements 15 into engagement with one another to clamp the bumper brackets in rotatably adjusted positions, and at the same time clamp the holder blocks in longitudinally adjusted positions along the side bars.

Various changes may be made without departing from the spirit of the invention as claimed.

What is claimed is:

1. The combination with a support having studs formed thereon, of a holder positioned upon said support and provided with recesses which receive said studs, a bumper supporting arm having one end resting on said holder, a pin projecting through said arm, and a U-shaped clip passing around said support, and the ends of the legs of said clip being seated in the ends of said pin.

2. The combination with a support, of a holder mounted upon the same and having interlocking engagement therewith, a bumper bracket rotatably adjustably supported upon said holder, a cross pin journaled in said bumper bracket, and a clip received around said support and holder and engaged by said pin for retaining the parts in position.

3. The combination with a support, of a holder longitudinally adjustable along the same, and having interlocking engagement therewith in its adjusted positions, a bumper bracket supported upon said holder, and a clip received around said support and holder and engaged by said bumper bracket for retaining the parts in position.

4. The combination with a support, of a holder, said support and holder being provided with interengaging means whereby the holder is firmly retained in its adjusted position upon said support, a bumper bracket rotatably positioned upon said holder, the engaging faces of which holder and bracket are provided with interengaging teeth, a cross pin journaled in said bumper bracket, and a clip received around said support and holder and engaged by said pin for retaining the parts in adjusted position.

5. The combination with a support provided on one of its faces with studs, of a block adapted to be positioned on said support and provided with recesses that are adapted to receive said studs, said block being provided in its upper surface with a recess having a notched surface, a bumper supporting arm, a head on the rear end thereof, which head is provided with teeth that are adapted to engage the teeth of the block, a transverse pin loosely arranged in said head, said pin being perforated to the sides of said head, a U-shaped clip positioned beneath the support, the ends of the legs of which clip extend through the apertures in the pin, and nuts seated on the ends of the legs of said clip above said pin.

In testimony whereof I have signed my name to this specification.

WALTER P. LIMACHER.